United States Patent [19]

Caldeira et al.

[11] Patent Number: 5,396,384
[45] Date of Patent: Mar. 7, 1995

[54] HARD DISK DRIVE ARCHITECTURE

[75] Inventors: Robert A. Caldeira, Santa Cruz; John C. Fravel, San Jose; Richard G. Ramsdell, Saratoga; Romeo N. Nolasco, Danville, all of Calif.

[73] Assignee: Quantum Corporation, Milpitas, Calif.

[21] Appl. No.: 881,678

[22] Filed: May 12, 1992

[51] Int. Cl.[6] ............................................. G11B 5/012
[52] U.S. Cl. .............................. 360/98.01; 360/97.01
[58] Field of Search ..................... 360/97.01–97.04, 360/98.01–98.02, 105; 361/395–398, 393

[56] References Cited

U.S. PATENT DOCUMENTS

| | | | |
|---|---|---|---|
| 3,849,800 | 11/1974 | Cuzner et al. | 360/97 |
| 4,062,049 | 12/1977 | Dirks | 360/78 |
| 4,385,333 | 5/1983 | Hasler | 360/97.03 |
| 4,396,959 | 8/1983 | Harrison et al. | 360/77 |
| 4,639,863 | 1/1987 | Harrison et al. | 360/107 |
| 4,669,004 | 5/1987 | Moon et al. | 360/77 |
| 4,930,029 | 5/1990 | Morita | 360/97.01 |
| 4,965,684 | 10/1990 | Stefansky | 360/78.12 |
| 4,980,783 | 12/1990 | Moir et al. | 360/98.01 |
| 5,025,335 | 6/1991 | Stefansky | 360/97.01 |
| 5,025,336 | 6/1991 | Morehouse et al. | 360/97.01 |
| 5,027,241 | 6/1991 | Hatch et al. | 360/105 |
| 5,136,468 | 8/1992 | Wong et al. | 361/393 |
| 5,190,480 | 3/1993 | Chau et al. | 439/637 |
| 5,241,438 | 8/1993 | Matsushima | 360/105 |
| 5,243,495 | 9/1993 | Reed et al. | 360/98.01 |
| 5,245,486 | 9/1993 | Hachiya et al. | 360/98.01 |

FOREIGN PATENT DOCUMENTS 9201283  1/1992  WIPO ................................ 360/106

Primary Examiner—A. J. Heinz
Assistant Examiner—Brian E. Miller
Attorney, Agent, or Firm—David B. Harrison

[57] ABSTRACT

A hard disk drive architecture includes a housing including a continuous base wall and continuous sidewalls extending from the base wall, and cooperating with a cover structure for enclosing and sealing an interior space for a plurality of rigid data storage disks mounted on a spindle, and a rotary actuator structure for positioning a stack of data transducer heads relative to concentric track locations defined on storage surfaces of the disks. The spindle includes a spindle motor for rotating the spindle and the disks. The housing defines an exterior recess region of the base wall. The recess region includes an opening for a connector pin array. A seal is provided for sealing the opening after the connector pin array is in place. A flex circuit mounting bracket within the interior space is provided for positioning and connecting to a flex circuit connecting to the rotary actuator structure and to the connector pin array. An analog read/write channel printed circuit board is located within the exterior recess region and includes an analog circuit connector socket for connecting to the connector pin array. A digital electronics main printed circuit board overlies the exterior recess region, connector pin array and analog read/write channel printed circuit board and includes a digital circuit connector socket for connecting to the connector pin array.

5 Claims, 9 Drawing Sheets

HARD DISK DRIVE ARCHITECTURE

FIELD OF THE INVENTION

The present invention relates to hard disk drives. More particularly, the present invention relates to a hard disk drive architecture which enables robotic assembly and checkout without connection to one of a plurality of available types of disk drive digital electronics control boards, each type enabling configuration of the hard disk drive with a desired interface characteristic.

BACKGROUND OF THE INVENTION

It is known to design hard disk drives as an arrangement of subparts or subsystems. Commonly assigned U.S. Pat. No. 4,396,959 (which later became U.S. Pat. Re. No. 32,075) describes an eight inch hard disk drive having four disks and a data storage capacity of up to 40 megabytes of data with four data storage disks. Since the development of disk drives in accordance with the referenced '959 patent, disk data storage capacities have increased to the present time, wherein it is now possible to store as much as 150 megabytes on a single three and one half inch diameter data storage disk. While twelve years ago the eight inch diameter disk drive was a prevalent form factor, today the prevalent form factor is three and one half inches, and as many as eight or more three and one half inch disk drives or more may fit into the space originally required by the eight inch disk drive form factor.

As drives have become smaller, they have also become less costly per byte of storage provided. One reason that costs have been reduced is through widespread use of robotic assisted assembly of subassemblies into the completed disk drive assembly.

Disk drives are typically assembled in a very clean environment which is free of particulate contamination. Usually, assembly occurs in a Class 100 or better clean room. Once the disk stack and actuator assembly are installed, the head and disk assembly is enclosed in a sealed arrangement by installation of a gasket and cover structure. Thereafter, certain electrical procedures, such as track and servo formatting, and burn-in occur, prior to packaging for shipment to the user, etc. In some situations, it is highly desirable to perform disk formatting procedures, and burn in before installation of a main printed circuit board carrying the circuitry needed to complete the disk drive. One example of a disk drive having a capability for track formatting and burn in before installation of a main printed circuit board is found in the present assignee's prior Q2000 eight inch disk drive product series, and as also explained in commonly assigned U.S. Pat. No. 4,396,959 (later U.S. Pat. Re. No. Re32,075). The Q2000 included a main printed circuit board which was mounted adjacent to a drive cover structure. A small circuit board carrying circuitry relating to the data transducer heads and to a head positioner servo loop was mounted inside the space enclosed by the cover, and included a connector array extending through the cover. A seal was provided between the connector array and the cover, so that particulate contaminants could not enter the enclosed space.

A similar arrangement was provided in the assignee's Q500 product series, and as described in commonly assigned U.S. Pat. No. 4,639,798, and particularly FIG. 1 thereof, which illustrates the interior circuit board as having an edge connector portion extending through a slot in the base wall of the drive housing. In the Q500 product series, the main printed circuit board was mounted below the bottom wall of the base casting, rather than above the cover structure.

A slightly different approach was followed in the assignee's Q200 product series, and as described in commonly assigned U.S. Pat. No. 4,669,004, for example. In the Q200, a read preamplifier/write driver circuit 36 was mounted on a flexible plastic printed circuit substrate 38 ("flex circuit") which included an arcuate portion 42 leading to the rotary actuator structure. A connector portion 40 of the flex circuit 38 extended exteriorly from the interior of the head and disk assembly via a gap between the cover and the base casting. The flex circuit extension plugged into a receptacle on the main printed circuit board which was mounted opposite to a floor wall of the base casting. The referenced '004 patent also describes a servo writer apparatus which was used to format the data tracks by using the voice coil rotary actuator structure of the disk drive itself.

Finally, a recent U.S. Pat. No. 4,965,684 has asserted novelty in providing a connector array between a flex circuit within an enclosed head and disk assembly, and an externally mounted main printed circuit board. In addition, it was known in the prior art to provide multiple stacked and interconnected printed circuit boards in hard disk drives. In some embodiments of prior art drives, one circuit board included analog read/write electronics, while another included digital control and interface electronics.

While all of these examples of prior approaches provided effective connections from the flex circuit to external circuitry, none of them provided a space efficient, fully nested multiple printed circuit board arrangement with interconnections being carried out by a single connector pin array extending from the flex circuit, through a nested circuit board to an overlying main circuit board.

SUMMARY OF THE INVENTION

A general object of the present invention is to provide a high storage capacity micro-Winchester hard disk architecture which overcomes limitations and drawbacks of the prior art.

A more specific object of the present invention is to provide a dual printed circuit board arrangement for a hard disk drive which enables attachment of servo writing apparatus without requiring installation of a digital main printed circuit electronics board.

Another specific object of the present invention is to provide a modularized high storage capacity micro-Winchester hard disk drive which enables independent check out of circuit modules and formatting of data storage disks prior to final assembly of the disk drive.

A further specific object of the present invention is to provide an arrangement for positioning and interconnecting plural printed circuit boards in a nested arrangement within a compact miniature hard disk drive.

In accordance with one facet of the present invention, a hard disk drive architecture includes a housing including a continuous base wall and continuous sidewalls extending from the base wall, and cooperating with a cover structure for enclosing and sealing an interior space for a plurality of rigid data storage disks mounted on a spindle, and a rotary actuator structure for positioning a stack of data transducer heads relative to concentric track locations defined on storage surfaces of the disks. The spindle includes a spindle motor for rotating the spindle and the disks. The housing defines an exterior recess region of the base wall. The recess region includes an opening for a connector pin array. A seal is provided for sealing the opening after the connector pin array is in place. A flex circuit mounting bracket within the interior space is provided for positioning and connecting to a flex circuit connecting to the rotary actuator structure and to the connector pin array. An analog read/write channel printed circuit board is located within the exterior recess region and includes an analog circuit connector socket for connecting to the connector pin array. A digital electronics main printed circuit board overlies the exterior recess region, connector pin array and analog read/write channel printed circuit board and includes a digital circuit connector socket for connecting to the connector pin array.

As one aspect of this facet of the invention, the analog read/write channel printed circuit board includes an analog circuit connector pin array aligned longitudinally with the flex circuit connector pin array, so that pins of the analog circuit connector pin array and pins of the flex circuit connector pin array pass into and contact the digital circuit connector socket of the digital electronics main printed circuit board.

As another facet of the present invention, a hard disk drive architecture includes a housing having a continuous base wall and continuous sidewalls extending from the base wall. The housing cooperates with a cover structure for enclosing and sealing an interior space enclosing a plurality of rigid data storage disks mounted on a spindle, and a rotary actuator structure for positioning a stack of data transducer heads relative to concentric track locations defined on storage surfaces of the disks. The spindle includes a spindle motor for rotating the spindle and the disks. A flex circuit mounting bracket within the interior space positions and connects to a flex circuit connecting to the rotary actuator structure. A flex circuit connector pin array is provided for connecting to the flex circuit. The housing defines an exterior recess region of the base wall including an opening for the flex circuit connector pin array and cooperating with a seal for sealing the opening after the flex circuit connector pin array is in place. An analog read/write channel printed circuit board is located within the exterior recess region and includes an analog circuit connector socket for connecting to the flex circuit connector pin array. Connector pins of the flex circuit connector pin array extend through and outwardly beyond the analog circuit connector socket for engaging a separate connector socket.

As one aspect of this facet of the invention, the rotary actuator structure defines servo writing fixture receptacle locations; and, the base wall defines a plurality of arcuate openings aligned with the servo writing fixture receptacle locations, whereby a servo writing fixture may be temporarily attached to the rotary actuator structure and track format information written to the disks via the rotary actuator structure and data transducer heads by servo writing apparatus in temporary electrical connection with the separate connector socket.

As a further aspect of this facet of the invention, a digital electronics printed circuit board is provided in overlying relation to the exterior recess region, the flex circuit connector pin array and the analog read/write channel printed circuit board. The digital electronics printed circuit board includes the separate connector socket for connecting to the flex circuit connector pin array.

As a further related aspect of this aspect of the invention, the analog read/write channel printed circuit board includes an analog circuit connector pin array aligned longitudinally with the flex circuit connector pin array, so that pins of the analog circuit connector pin array and pins of the flex circuit connector in array pass into and contact the separate connector socket of the digital electronics printed circuit board.

These and other objects, advantages, aspects and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

Figure 1:
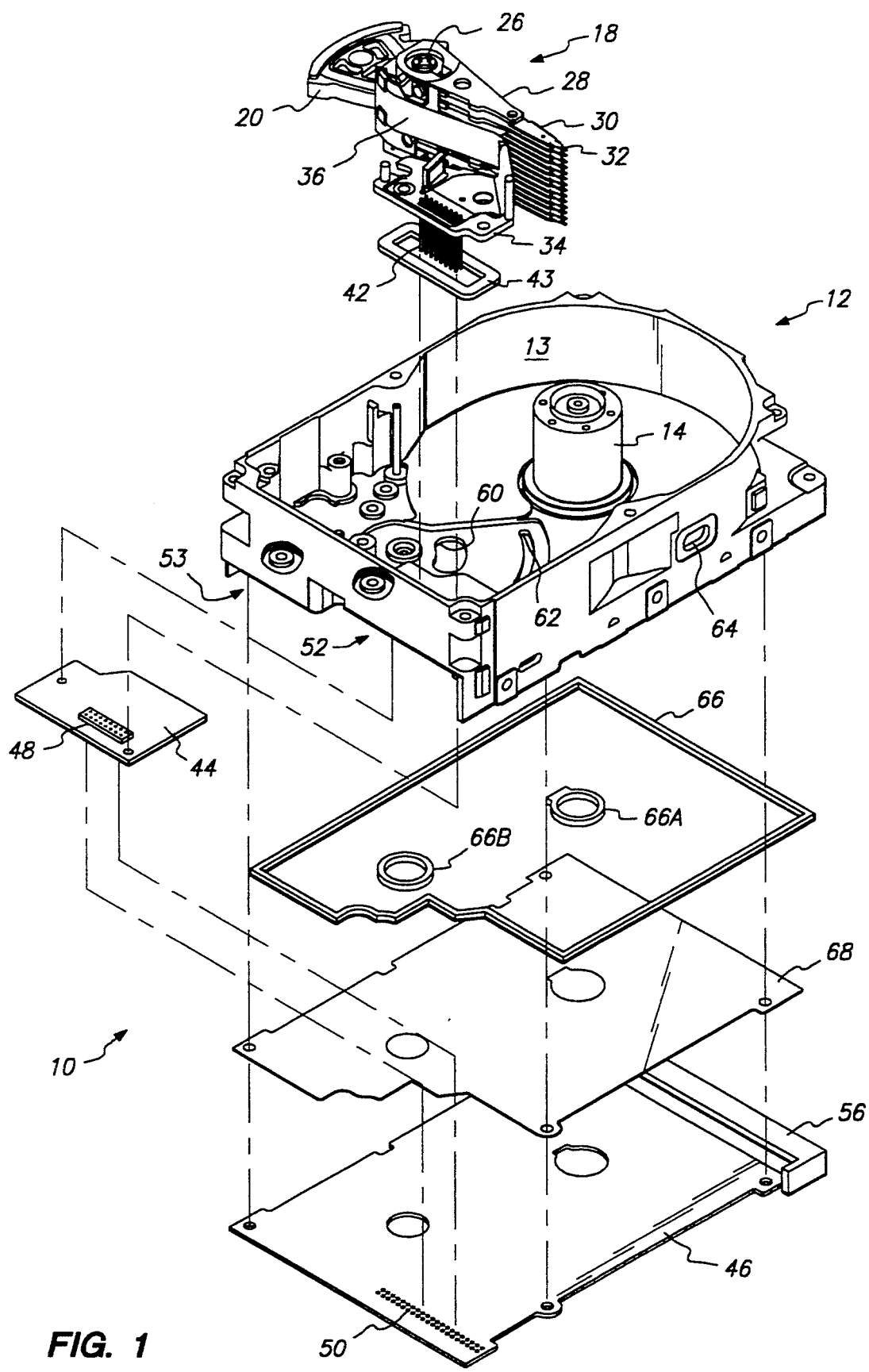
FIG. 1 is an exploded isometric assembly drawing of a high capacity hard disk drive in accordance with principles and aspects of the present invention.
Figure 2:
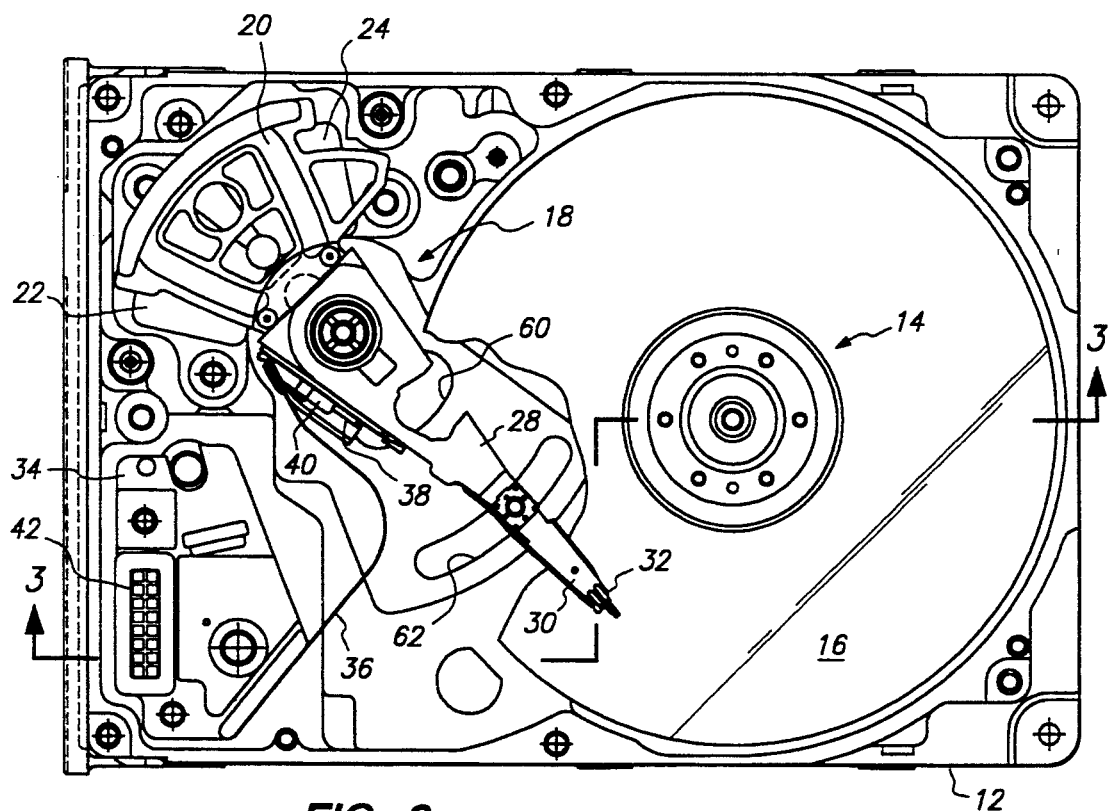
FIG. 2 is a somewhat diagrammatic top plan view of the FIG. 1 disk drive following assembly thereof.
Figure 3:
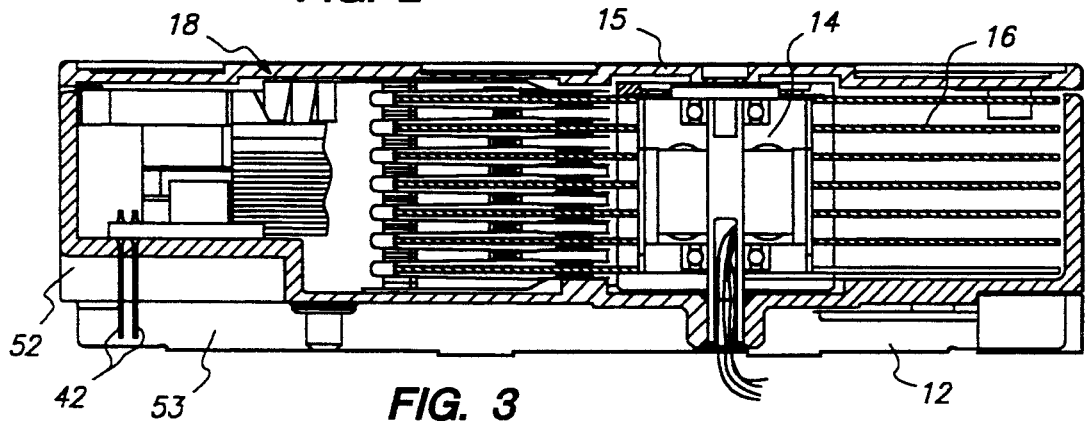
FIG. 3 is a side view in elevation and section of the FIG. 1 disk drive before installation of a digital control electronics main board.

In accordance with principles of the present invention, a high capacity miniature disk drive 10 includes a base 12 formed of cast aluminum alloy and having the features generally illustrated in FIGS. 1-4. The base 12 defines an interior space 13 which is enclosed by a cover assembly 15 (shown in FIG. 3) to form an airtight controlled, clean environment free of particulate contamination as is conventional with Winchester disk drive technology. A spindle hub/motor assembly 14 extends upwardly from a floor wall of the base and provides a central hub upon which e.g. seven data storage disks 16 are stacked in spaced apart relationship as shown in FIG. 3.

The disks 16 are coated with a suitable thin film magnetic data storage media material, and each defines e.g. 2096 concentric data storage tracks at a track density of 2,290 tracks per inch. The high quality thin film storage media accommodates as many as 50,500 bits per inch in lineal recording density. With a 1,7 RLL encoding methodology, and with an embedded sector servo format and control system, and with a 16 radial zone, split data field arrangement, the disk drive 10 is capable of storing 1.05 gigabytes of formatted user data.

A mass balanced, rotary voice coil actuator assembly 18 includes a single molded flat wedge-shaped coil structure 20 which rotates in a magnetic gap formed by oppositely facing, polar aligned pairs of permanent magnets 22 and 24. The magnets 22 and 24 are mounted to ferromagnetic flux return plates, and the magnetic flux is essentially confined to the magnetic gap through which the coil structure 20 rotates. The actuator assembly 18 rotates about an axis 26, and in addition to the coil 20 includes an E-block assembly 28, load beams 30 and sliders 32 carrying thin film magnetic read/write heads. Structural details of presently preferred load beams 30 are described in commonly assigned U.S. Pat. No. 5,027,241, the disclosure of which is hereby incorporated herein by reference. The actuator assembly 18 thus positions the head sliders and heads 32 to selected ones of cylindrically aligned data storage tracks on the disks 16.

A flex circuit mounting bracket 34 connects to a flex circuit 36 which carries a plurality of electrical signal paths to a fixed portion 38 mounted against the E-block assembly 28. The fixed portion includes mounting and connection pads for an integrated circuit 40 and for minute head wires connecting to each one of the 14 thin film heads 32. The integrated circuit 40 is a high performance, low power, high gain bipolar monolithic read/write preamplifier designed for use with two-terminal thin film recording heads. The circuit 40 provides write current control, data protection circuitry and a low-noise preamplifier for up to fourteen channels. The circuit 40 may be a type VM312H, from VTC, Inc., of Bloomington, Minn., or equivalent. Operating current for the actuator coil 20 and for the circuit 40 is supplied over the flex circuit 36. Control and data signals to and from the circuit 40 are also carried over conductive paths of the flex circuit 40 to an array 42 of aligned connector pins. The connector pins are secured in a predetermined alignment by the bracket 34 and extend downward through a gasket 43 and an aligned opening in the base casting 12 so as to pass through an analog read/write circuit board 44 and also to and through a digital drive control electronics main printed circuit board 46. A pin-pass-through receptacle 48 on the analog circuit board 44, and a receptacle 50 on the main circuit board 46 engage the pins 42 and thereby establish electrical interconnections between the flex circuit 36, the analog circuit board 44 and the main circuit board 46.

Figure 4:
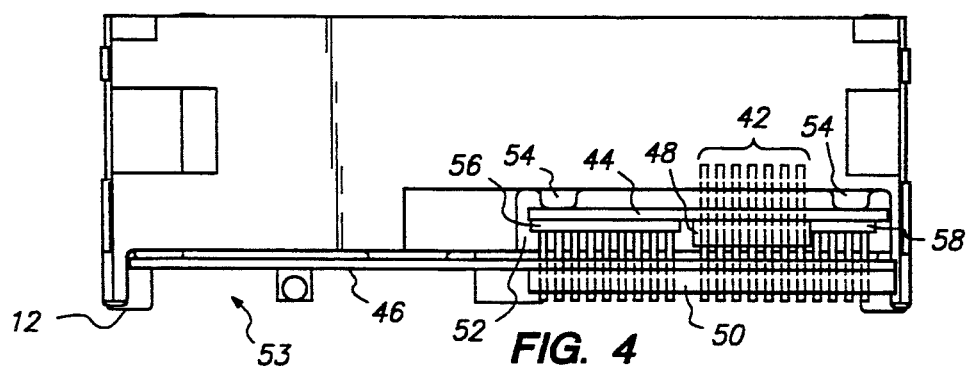
FIG. 4 is an enlarged left end view in elevation of the FIG. 1 disk drive showing the mounting and connection configuration of the head and disk assembly, an analog read/write circuit board, and the digital control electronics main board.
Figure 9:
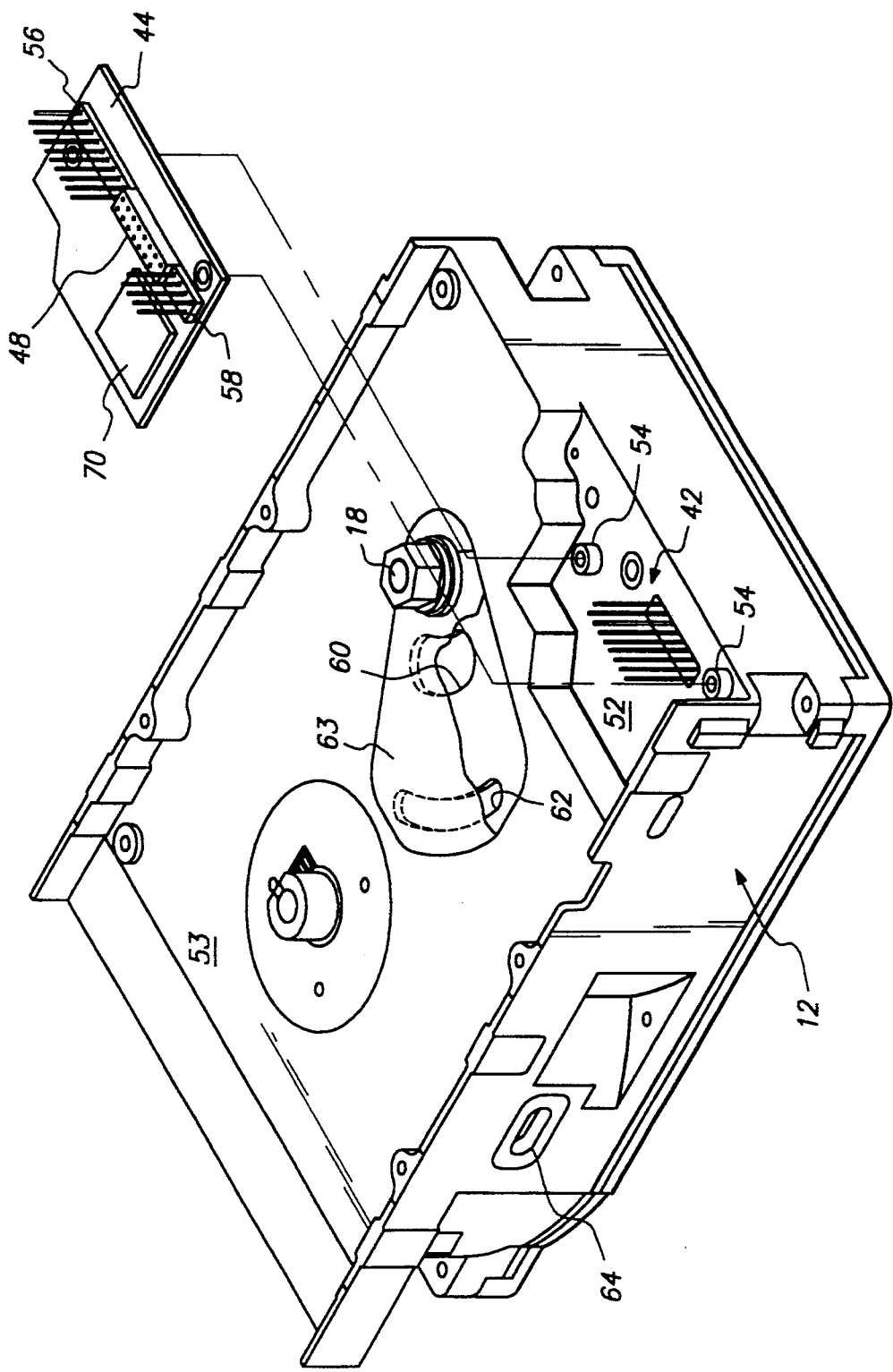
FIG. 9 is an exploded isometric assembly drawing of bottom plan view of the FIG. 1 high capacity disk drive in accordance with principles and aspects of the present invention.

FIGS. 4 and 9 illustrate the nested relationship of the analog circuit board 44 relative to the main circuit board 46 and also the pin array 42. As perhaps best illustrated in FIGS. 4 and 9, the analog circuit board 44 is positioned in an exterior recess area defined by the base 12 and denoted by the reference numeral 52. The recess area is upwardly inset relative to a larger planar space 53 defined within downwardly depending sidewall extensions of the base 12 in which the main digital circuit board 46 is located. Two bosses 54 are visible in FIGS. 4 and 9 and function to position the analog board 44 away from a major surface of the base 12 defining the recess 52. Two additional pin arrays 56 and 58 extend downwardly from the analog circuit board 44 and enter aligned pin receptacles of the connector 50 of the main circuit board 46. Thus, those skilled in the art will appreciate that the drive 10 may be assembled and embedded servo tracks and data track formats written and verified upon installation of the analog read/write circuit board 44, and before the digital control circuit board 46 is installed. In this manner, the drive 10 may be configured with any one of a plural number of types of control boards 50 supporting different electrical host-disk drive interfaces, such as SCSI II or AT interfaces, for example.

The base 12 defines three openings for servo writing purposes: radially concentric slots 60 and 62 which receive and align a collated mirror fixture in accordance with the teachings of commonly assigned U.S. Pat. No. 4,920,442, the disclosure of which is hereby incorporated herein by reference; and an opening 64 in a sidewall of the base 12 for admitting a servo clock track head which writes a clock track on a predetermined one of the data track surfaces. It should be understood that the actuator structure 18 is used to write the servo and data track formats under control of a servo writer (not shown), as taught in the referenced '442 patent. The servo collet fixture is automatically positioned robotically and removed from the drive 10 before the main circuit board 50 is installed. After servo writing is completed and verified, the openings 60, 62 and 64 are sealed with suitable sealing membranes, such as adhesive-coated plastic film 63, shown in hidden view in FIG. 9.

Gaskets 66, 66A and 66B are used to seal an acoustic baffle sheet 68 to the underside of the base 12 in order to reduce acoustic noise. A double top-cover arrangement (not shown) is also provided to reduce unwanted acoustic noise. These structural noise reduction techniques are described in a commonly assigned, copending U.S. patent application Ser. No. 07/824,031 filed on Jan. 22, 1992, and entitled "Disk Drive with Reduced Acoustic Noise", the disclosure of which is hereby incorporated by reference. Further reduction of noise within the spindle motor 14 is accomplished electrically in accordance with techniques described in commonly assigned, copending U.S. patent application Ser. No. 7/847,147 filed on Feb. 27, 1992, and entitled "Digital-Analog Driver for Brushless D.C. Spindle Motor", now U.S. Pat. No. 5,210,474 the disclosure of which is hereby incorporated herein by reference.

Figure 5:
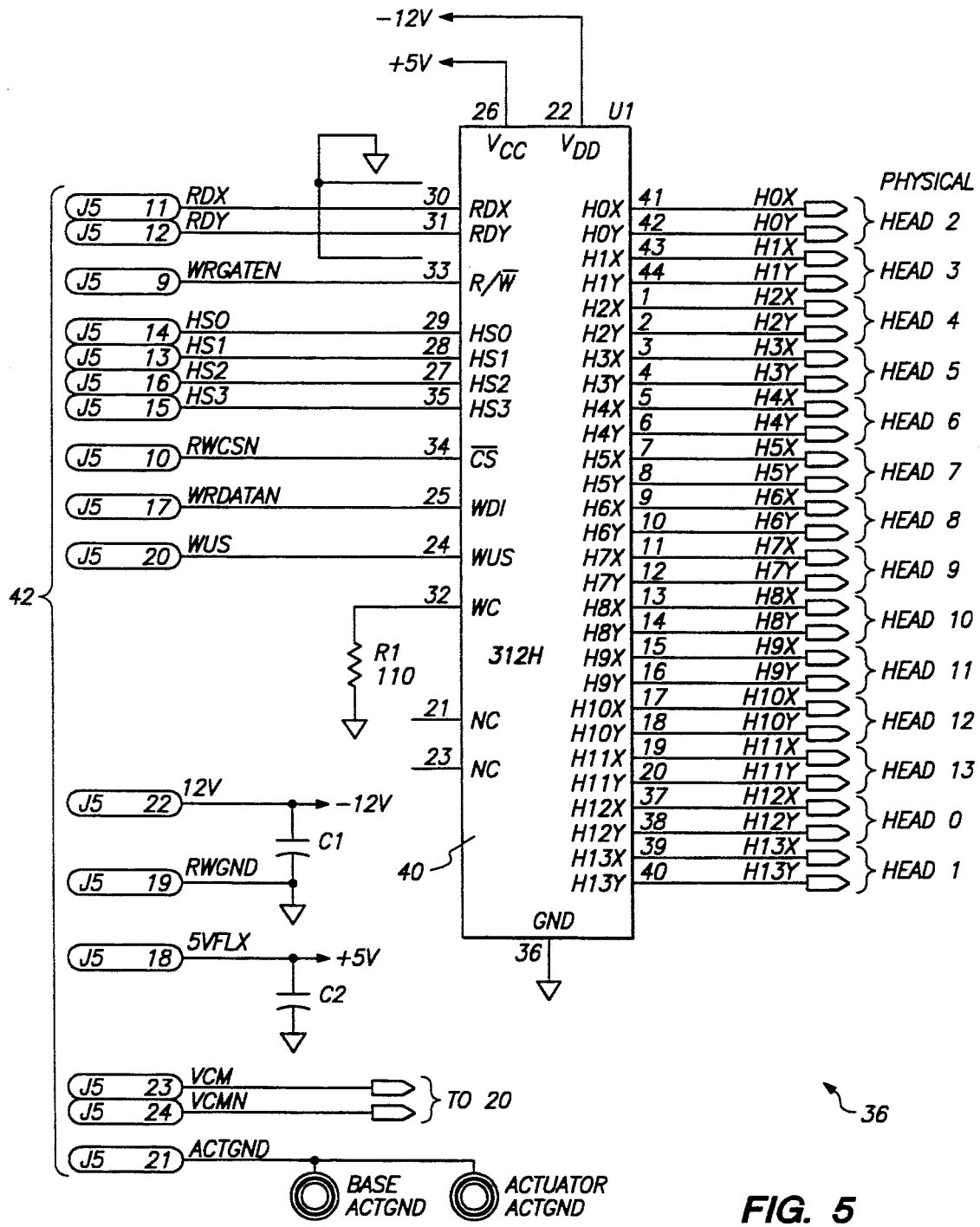
FIG. 5 is an electronic circuit diagram of circuitry carried by a flexible plastic connection substrate within the enclosed space of the head and disk assembly ("HDA") of FIG. 1 for connecting a rotary voice coil actuator coil and 14 thin film heads to circuitry internal to the enclosed HDA.
Figure 6A:
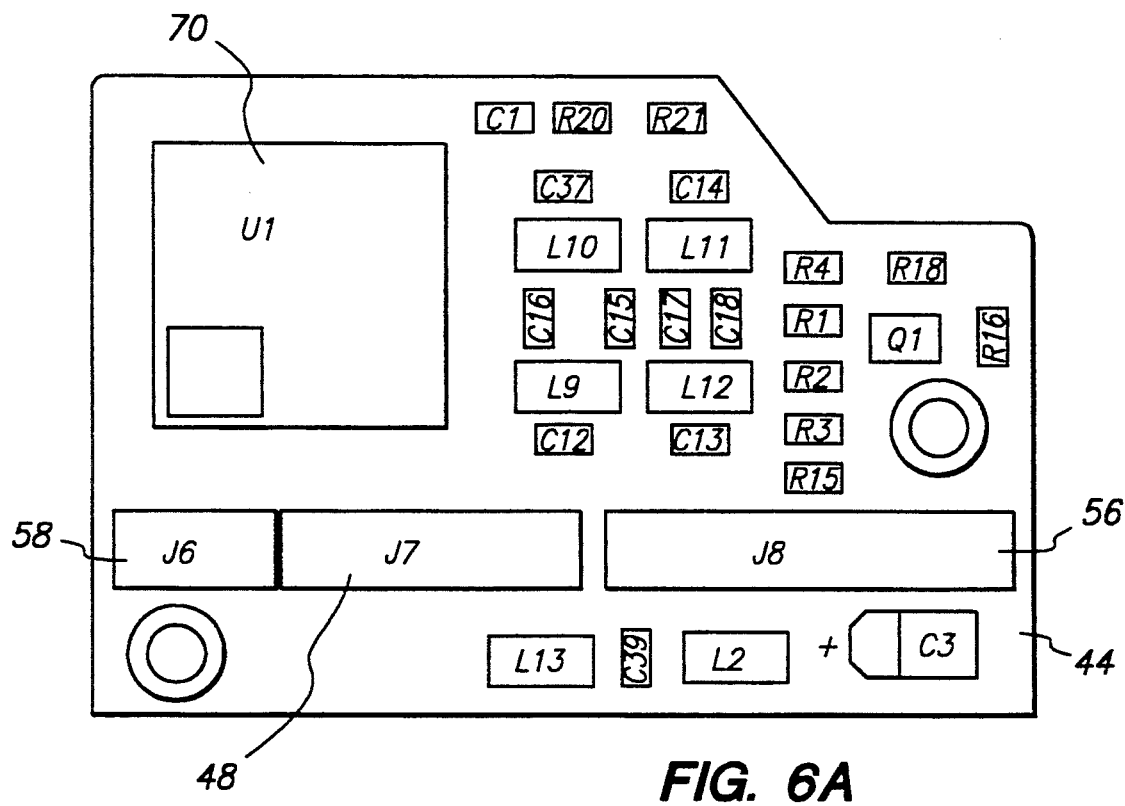
FIG. 6A is a top plan view of the analog read/write circuit board shown in FIGS. 1 and 4; and, FIG. 6B is a bottom plan view of the same analog circuit board.
Figure 6B:
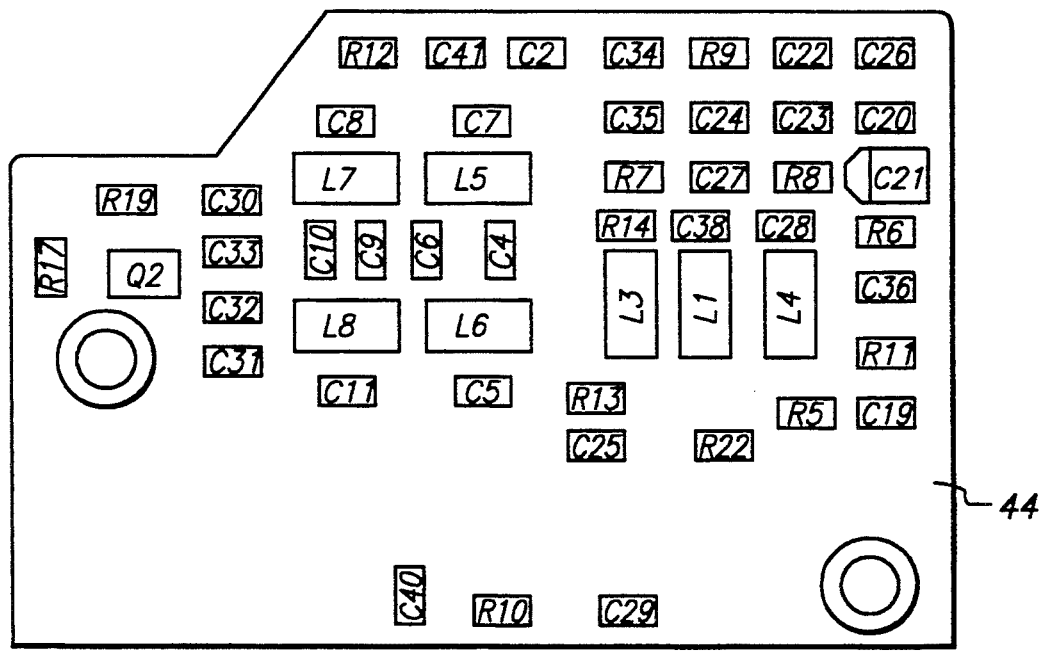
Figure 7A:
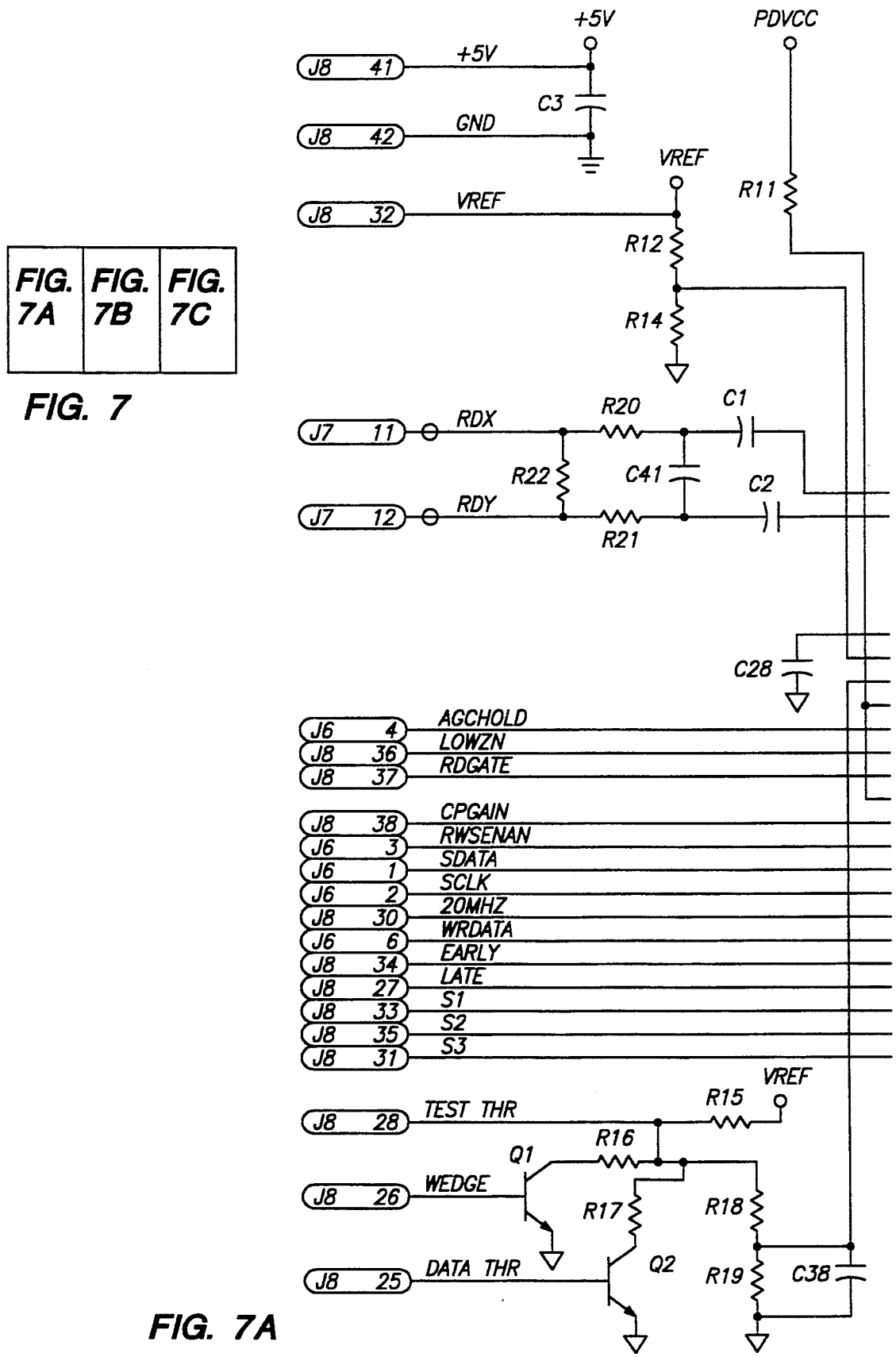
FIGS. 7A, 7B and 7C together comprise a single electronic circuit diagram of circuitry carried by the FIGS. 1, 4, and 6A, 6B read/write circuit board, wherein FIG. 7 comprises a layout arrangement of the FIGS. 7A, 7B and 7C drawing sheets.
Figure 7B:
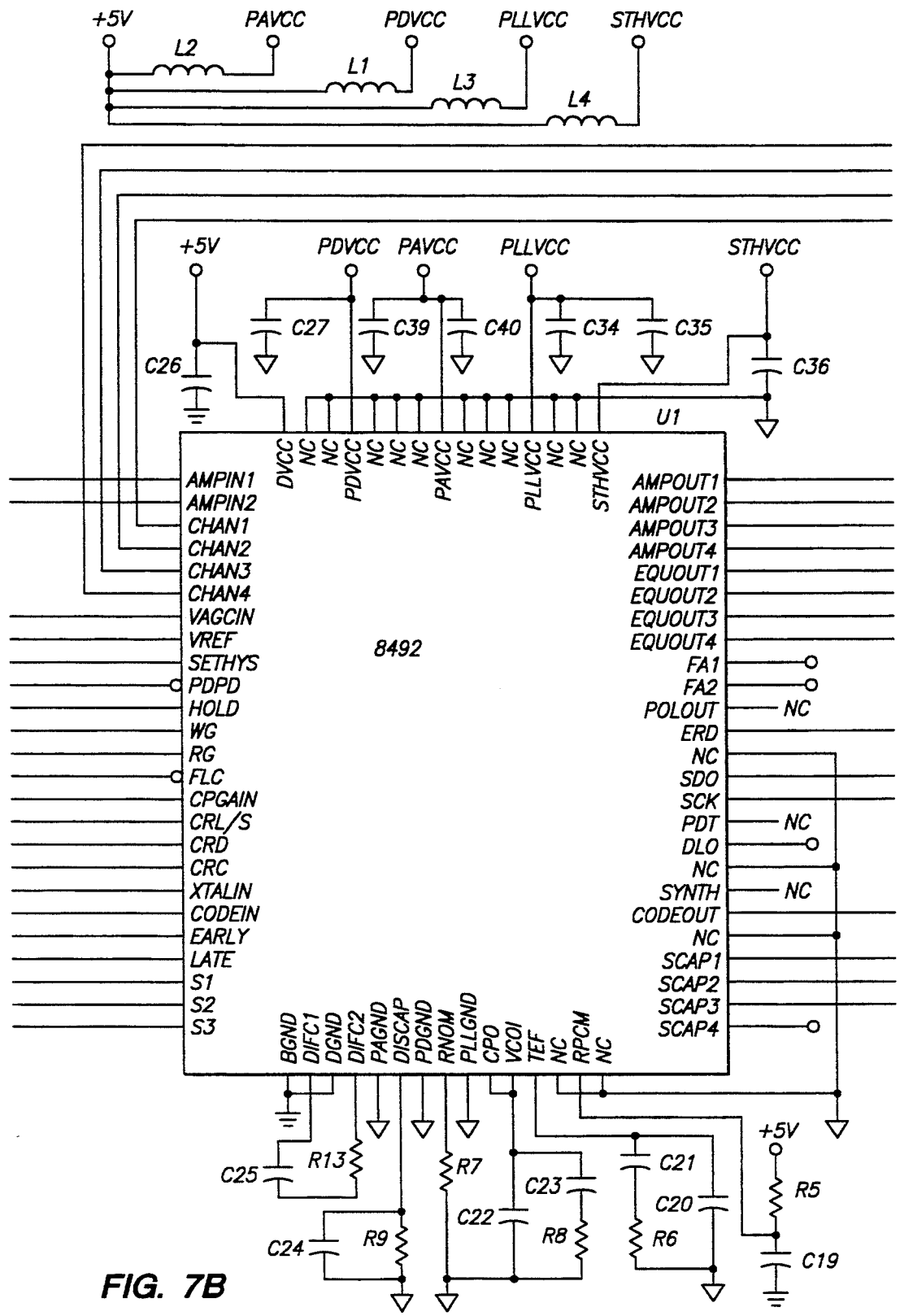
Figure 7C:
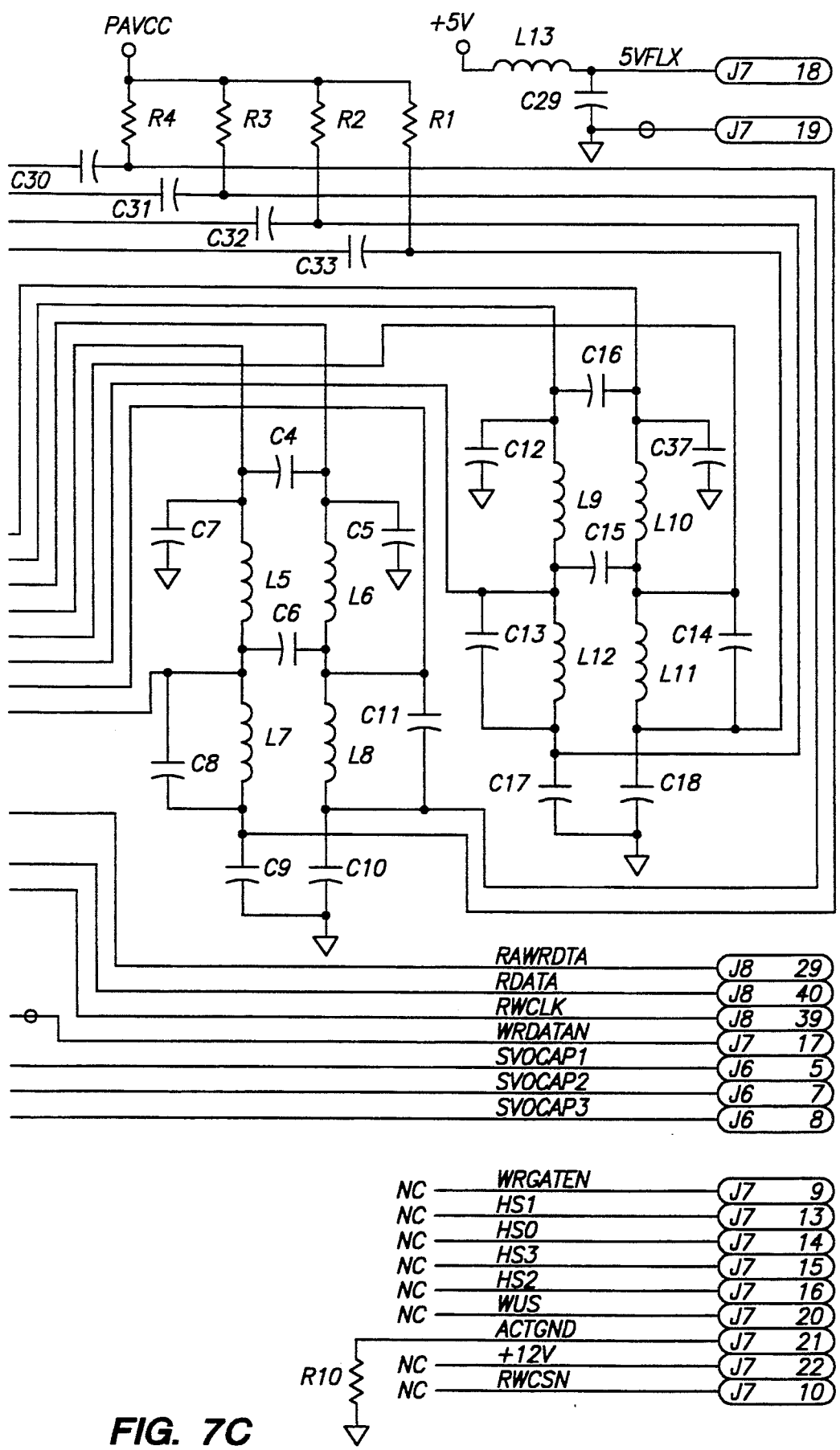

FIG. 5 describes electrically the circuit 40 and the connector paths carried on the flex circuit 36. FIGS. 6A and 6B illustrate a physical layout of the analog circuit board. The circuit board 44 includes a number of discrete electrical components and a large scale integrated circuit 70, which may be a type DP8492 hard disk data path electronics IC made by National Semiconductor Corporation, or equivalent. The circuit 70 is connected to the external circuitry carried on the circuit board 44 in accordance with the schematic circuit diagram provided by FIG. 7 for example. The circuit 70 incorporates, for example, a pulse/servo detector, a data synchronizer, a frequency synthesizer and a write precompensation circuit. The circuit 70 thus enables servo writing apparatus to define and format the concentric data storage tracks and the embedded servo sectors without requiring any later compensation or adjustment following removal of the servo writing fixtures and attachment of the main digital control electronics board 46.

Figure 8:
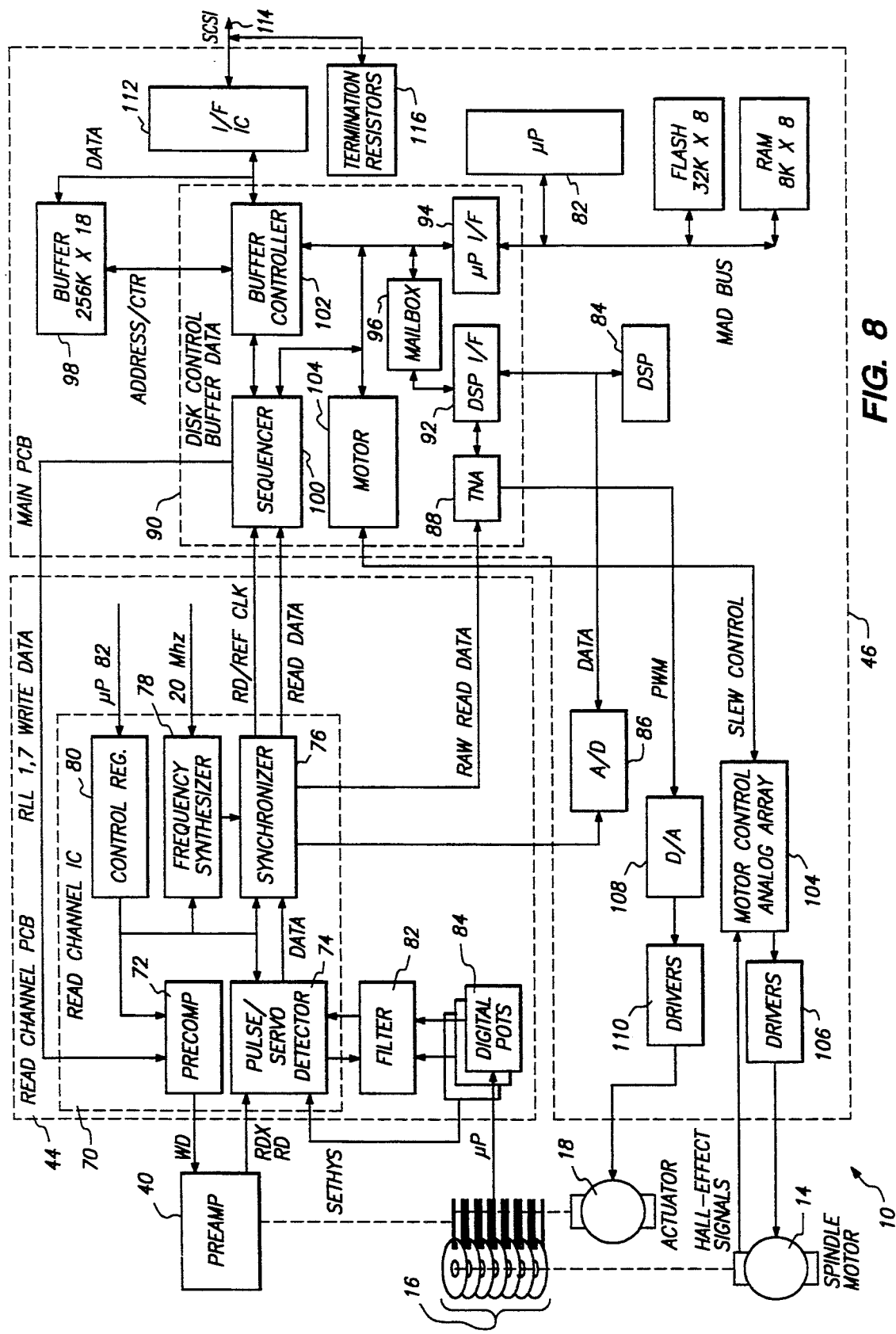
FIG. 8 is an electrical block diagram of the FIG. 1 disk drive.

FIG. 8 provides a summary view of a presently preferred electrical architecture of the drive 10. Therein, the digital main circuit board 46 is shown in combination with the analog read/write circuit board 44, and with the preamplifier 40, disks 16, spindle motor 14, and actuator assembly 18. The read channel board 44 includes the circuit 70 which contains the write precompensator circuit 72, the pulse/servo detector circuit 74, the data synchronizer 76, the frequency synthesizer 78 and a control register 80 which enables control by a master microcontroller 82 located on the main digital board 46. The analog read channel board 44 also includes a channel filter 82 and digital gain control potentiometers 84.

The digital main circuit board includes a digital data flow microcontroller 82, and a digital signal servo processor ("DSP") 84 which is dedicated to controlling a head position servo Lccp. Sampled peak amplitudes from one or more servo bursts are converted into digital values by an analog to digital converter 86 and supplied to the DSP 84. Raw data, including servo track number data, is supplied to a servo decoder 88 within a disk control ASIC 90. The servo decoder 88 decodes the servo data and supplies it to the DSP 84 through a DSP interface 92.

A microprocessor interface 94, and mailbox registers 96 enable flags to be set and read by each processor 82 and 84, thereby enabling communications to be conducted between the data flow microcontroller 82 and the servo DSP 84 via commonly accessible portions of a buffer memory array 98. Each processor 82, 84 has a direct access channel to the buffer memory array 98, and commands, data values and messages are passed between the microcontroller 82 and the DSP 84 via the commonly accessible areas of the buffer memory array 98.

The disk control ASIC 90 further includes a data sequencer 100 and a buffer memory controller 102 which controls accesses into the buffer 98. A motor speed monitor circuit 104 is also included in the ASIC 90, and controls a motor control analog circuit array 104. Power drivers 106 control operation of the spindle motor 14. Details of the spindle motor controller 104 are provided in commonly assigned U.S. patent application Ser. No. 07/847,147 filed on Feb. 27, 1992 and entitled "Digital-Analog Driver for Brushless D.C. Spindle Motor", the disclosure of which being hereby incorporated herein by reference.

The servo control circuit 88 provides a PWM control signal output to a digital to analog converter 108 which generates analog driving currents which are amplified and put out by current drivers 110 to the coil 20 of the rotary actuator 18.

A high level interface circuit 112, such as one implementing the SCSI II convention, extends to a SCSI bus 114. A termination resistor array 116 may also be provided, as is conventional. The interface circuit 112, acting as a target, receives commands and data blocks from a host computer acting as an initiator, and stores the commands and data blocks in the cache memory array 98. The commands are then received, decoded and executed by the microcontroller 82 on an interrupt driven basis, while the data blocks pass to and from selected storage locations on the array of disks 16.

The signal paths shown in FIG. 8 illustrate in general the flow of data and control signals throughout the disk drive 10. Patents and patent applications describing further aspects of the electrical architecture are as follows: commonly assigned, copending U.S. patent applications Ser. No. 07/569,065 filed on Aug. 17, 1990, and entitled "Edge Servo for Disk Drive Head Positioner", now U.S. Pat. No. 5,170,299; Ser. No. 07/650,791 filed on Feb. 1, 1991, and entitled "On-The-Fly Error Correction with Embedded Digital Controller"; now U.S. Pat. Ser. No. 5,241,546; Ser. No. 07/710,861 filed on Jun. 4, 1991, and entitled "Miniature Disk Drive Having Embedded Sector Servo with Split Data Fields and Automatic On-The-Fly Data Block Sequencing"; Ser. No. 07/710,172 filed on Jun. 4, 1991, and entitled "Servo Data Recovery Circuit for Disk Drive Having Digital Embedded Sector Servo"; Ser. No. 07/710,065 filed on Jun. 4, 1991 and entitled "Fault Tolerant RLL Data Sector Address Mark Decoder" now U.S. Pat. No. 5,231,545; Ser. No. 07/710,171 filed Jun. 4, 1991, and entitled "Miniature Fixed Disk Drive" now U.S. pat. No. 5,255,136. The disclosures of these patents and applications are hereby incorporated herein by reference.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A micro-Winchester hard disk drive architecture comprising:
   cover means,
   an elongated, rectangular box shaped housing means including a continuous base wall and continuous sidewalls extending from the base wall, and cooperating with the cover means for enclosing and sealing an interior space, a spindle mounted to the base wall and to the cover means, a plurality of rigid data storage disks mounted on the spindle and extending away from the base wall within the interior space, a plurality of data transducer heads, there being a head for a data storage surface of each disk, and a rotary voice coil actuator structure rotatably mounted to the base wall and to the cover means within the interior space for positioning the data transducer heads relative to concentric track locations defined on storage surfaces of the disks, the spindle including a spindle motor means for rotating the disks,
   a flex circuit means within the interior space for carrying and connecting a read preamplifier/write driver integrated circuit to the data transducer heads and carrying circuit paths to a voice coil of the rotary voice coil actuator structure,
   the housing means defining an inwardly-stepped exterior recess region at one corner of the base wall adjacent to a corner including a voice coil motor of the rotary actuator structure,
   a connector pin array extending through opening means defined through a wall of the inwardly-stepped exterior recess region and including sealing means for sealing the opening means after the connector pin array is in place, the connector pin array extending entirely through and beyond the stepped exterior recess region, a flex circuit mounting bracket means mounted to the housing means within the interior space adjacent to the inwardly-stepped exterior recess region for positioning and connecting the flex circuit means connecting to the rotary actuator structure and the read preamplifier/write driver integrated circuit to the connector pin array, an analog read/write channel printed circuit board located entirely within the stepped exterior recess region of the housing means and including an analog-digital read/write channel integrated circuit and an analog circuit pin-pass-through connector socket means for making electrical connections with predetermined ones of the connector pin array, and further including a digital circuit connector pin array located adjacent to and in line with the pin-pass-through connector socket means for connecting to the analog-digital read/write channel integrated circuit of the analog read/write channel printed circuit board means, and a digital electronics printed circuit board entirely outside of and overlying the stepped exterior recess region and including a single digital circuit connector socket for connecting circuitry of the digital electronics printed circuit board to the connector pin array and to the digital circuit connector pin array and for supplying power to the connector pin array for powering the read preamplifier/write driver integrated circuit and the analog-digital read/write channel integrated circuit wherein the internested arrangement of the analog and digital printed circuit boards enable a hard disk drive to be compact.

2. The micro-Winchester hard disk drive architecture set forth in claim 1 wherein the single separate connector socket means of the digital electronics printed circuit board connects via the flex circuit connector pin array to analog current signal paths of the rotary actuator and to digital head selection signal paths of the read/preamplifier/write driver integrated circuit, and wherein the pin-pass-through connector socket means of the analog read/write channel printed circuit board connect via the flex circuit connector pin array to read and write signal paths of the read/preamplifier/write driver integrated circuit.

3. A micro-Winchester hard disk drive architecture comprising:

cover means, an elongated, rectangular box shaped housing means including a continuous base wall and continuous sidewalls extending from the base wall, and cooperating with the cover means for enclosing and sealing an interior space, the base wall defining at least one opening enabling temporary access by a servowriter apparatus to the interior space at the vicinity of a rotary voice coil actuator structure during a servowriting process incident to disk drive manufacturing, the opening being closed by a servo access opening seal applied following the servowriting process, a rotating disk spindle mounted to the base wall and to the cover means, a plurality of rigid data storage disks mounted on the spindle and extending away from the base wall within the enclosed space, a plurality of data transducer heads, there being a head for a data storage surface of each disk, the rotary voice coil actuator structure being mounted to the base wall and to the cover means within the enclosed space for positioning the data transducer heads relative to concentric track locations defined on the storage surfaces of the disks, the rotating disk spindle including a spindle motor means for rotating the disks, a flex circuit means within the interior space for carrying and connecting a read preamplifier/write driver integrated circuit to the data transducer heads and carrying circuit paths to a voice coil of the rotary voice coil actuator structure, a flex circuit connector pin array for connecting to the flex circuit means, the housing means defining a stepped exterior recess region of the base wall at one corner of the base wall adjacent to a corner including a voice coil motor of the rotary actuator structure, a base of the stepped exterior recess region defining an opening for the flex circuit connector pin array and including pin array sealing means for sealing the opening means after the flex circuit connector pin array is in place, the connector pin array extending entirely through and beyond the exterior recess region, and analog read/write channel printed circuit board means located entirely within the stepped exterior recess region and including an analog-digital read/write channel integrated circuit and an analog circuit pin-pass-through connector socket means for making electrical connections with predetermined ones of the flex circuit connector pin array, and wherein connector pins of the flex circuit connector pin array extend through and outwardly beyond the analog circuit pin-pass-through connector socket means for engagement with a separate single connector socket means located in a space beyond the stepped exterior recess region, and further including a digital circuit connector pin array located adjacent to and in line with the pin-pass-through connector socket means for connecting digital circuitry of the analog read/write channel printed circuit board means to the separate single connector socket means, the separate single connector socket means supplying power to the connector pin array for powering the read preamplifier/write driver integrated circuit and the analog-digital read/write channel integrated circuit wherein the internested arrangement of the analog and digital printed circuit boards enable a hard disk drive to be compact.

4. The micro-Winchester hard disk drive architecture set forth in claim 3 further comprising digital electronics printed circuit board means overlying the exterior recess region, flex circuit connector pin array and analog read/write channel printed circuit board means and including the single separate connector socket means for connecting to the flex circuit connector pin array and to the digital circuit connector pin array.

5. The micro-Winchester hard disk drive architecture set forth in claim 4 wherein the single separate connector socket means of the digital electronics printed circuit board means connects via the flex circuit connector pin array to analog current signal paths of the rotary actuator and to digital head selection signal paths of the read/preamplifier/write driver integrated circuit, and wherein the pin-pass-through connector socket means of the analog read/write channel printed circuit board means connect via the flex circuit connector pin array to read and write signal paths of the read/preamplifier/write driver integrated circuit.

* * * * *